United States Patent [19]
Onmori et al.

[11] Patent Number: 4,788,614
[45] Date of Patent: Nov. 29, 1988

[54] LOCKING MECHANISM IN A MAGNETIC TAPE CASSETTE

[75] Inventors: Shozo Onmori; Shingo Katagiri; Kengo Oishi, all of Kanagawa, Japan

[73] Assignee: Fuji Photo Film Co., Ltd., Kanagawa, Japan

[21] Appl. No.: 900,478

[22] Filed: Aug. 26, 1986

[30] Foreign Application Priority Data

Oct. 18, 1985 [JP] Japan .............................. 60-158683

[51] Int. Cl.$^4$ ........................................... G11B 23/02
[52] U.S. Cl. .................................... 360/132; 242/198
[58] Field of Search ................. 360/132; 242/197–201

[56] References Cited

U.S. PATENT DOCUMENTS 3,980,570  9/1976  Okuda et al. .................. 264/284 X
4,557,433 12/1985  Fitterer et al. ................. 242/190 X
4,572,461  2/1986  Horikawa et al. .................. 242/198
4,660,784  4/1987  Sunida et al. ....................... 242/198

FOREIGN PATENT DOCUMENTS 0063780  4/1985  Japan ................................. 360/132
2167386  5/1986  United Kingdom ............... 360/132

Primary Examiner—John H. Wolff
Assistant Examiner—David J. Severin
Attorney, Agent, or Firm—Sughrue, Mion, Zinn, Macpeak and Seas

[57] ABSTRACT

A magnetic tape cassette of two half cases. A locking member is slidable backwards to lock the hubs holding the tape. The locking member is biased by a spring fixed to a protrusion at the front of one of the half cases. Backward facing legs of the springs slidably engage a lateral recess in the locking member to bias it backwards against the hubs.

6 Claims, 2 Drawing Sheets

LOCKING MECHANISM IN A MAGNETIC TAPE CASSETTE

BACKGROUND OF THE INVENTION

1. Field of the Invention

This invention relates to magnetic tape cassettes, and more specifically to a novel audio compact cassette which is equal to or smaller than the "Philips" type magnetic tape cassette in size.

2. Background Art

Recently, cassette tape recorders have been decreased both in size and in weight. Also magnetic tape cassettes for use with these miniaturized recorders have also been miniaturized. In the field of audio technique also, there has been a strong demand for the provision of a magnetic tape cassette which can suitably record and reproduce signals with high quality and high density for a long period of time. In order to meet this requirement, there has been proposed a magnetic tape cassette operated according to a digital system such as a pulse modulation (PCM) system. In a digital system, unlike an analog system, the recording and reproducing operation is carried out with input signals converted into pulse signals. In the magnetic tape operated according to the digital system, the recording frequency band must be about five times as wide as that of a conventional audio magnetic tape. Therefore, a larger video tape cassette whose recording frequency band is wider than that of an audio compact cassette is extensively employed.

Video tape cassettes, except for special ones, are operated according to a rotary magnetic head system. The video tape cassette has a guard panel which is adapted to close the opening formed in the front part of the cassette, and is swingable upwardly of the cassette. That is, the magnetic tape cassette operated according to the digital system is used for the recording and reproducing operation of a high-density wide frequency band having a short recording wavelength in comparison with the conventional audio compact cassette. Therefore, the structure of the cassette should be such that the magnetic tape therein is sufficiently protected.

A magnetic tape cassette satisfying the above-described requirement, i.e., a magnetic tape cassette to which the technical concept of the invention is applied is suitable for audio devices employing a relatively wide frequency band recording and reproducing system similarly as in the above-described video tape cassette. The magnetic tape cassette is a small one which is equal to or smaller than the conventional audio compact cassette in size. Accordingly, it can be expected that the magnetic tape cassette is carried and used outdoors similarly as or perhaps more frequently than in the case of the conventional audio compact cassette. Therefore, the magnetic tape cassette should be designed so as to positively prevent the difficulty that, when the cassette is carried about, the cassette is vibrated, so that the magnetic tape becomes slackened and is jammed.

One example of the magnetic tape cassette satisfying this condition has a locking member which locks the hubs on which the magnetic tape is wound, when the cassette is not in use, and releases the hubs when the cassette is in use (operated). The locking member is designed as follows. The locking member is biased towards the hubs by a spring. When the cassette is not in use, the protrusion of the locking member is abutted against the hubs, and when it is used, the protrusion is disengaged from the hubs. As the cassette is miniaturized as was described before, the components are also formed smaller, which makes it difficult to combine them together to form the cassette. As the locking member is combined with the cassette body while being urged by the spring, it is liable to come off. Thus, the locking member is one of the factors which make it difficult to assemble the magnetic tape cassette.

The spring for biasing the locking member is coupled to the base part of the locking member, and its legs are slidably supported on the front wall of the lower half case or the upper half case. As the upper and lower half cases are made of resin such as ABS resin which is inexpensive and can be readily molded, sometimes the front wall is scraped by the legs of the spring, to form shavings. The shavings thus formed may attach to the magnetic tape to cause dropouts. That is, the shavings may make it impossible to record or reproduce signals with high accuracy.

SUMMARY OF THE INVENTION

Accordingly, an object of this invention is to eliminate the above-described difficulties accompanying a conventional magnetic tape cassette.

More specifically, an object of the invention is to provide a magnetic tape cassette in which the locking member can be readily combined with the cassette body, the hubs can be positively locked, and no shavings are formed by the sliding of the legs of the spring adapted to urge the locking member, whereby tape dropouts are prevented.

In a magnetic tape cassette of the invention, a pair of hubs on which a magnetic tape has been wound and a locking member for locking and releasing the hubs are placed in the internal space formed by the upper and lower half cases of the cassette. According to the invention, the locking member is made of hard resin and has a recess in the end closer to the front wall of the cassette in such a manner that the recess is extended in the lateral direction of the locking member. The upper half case has a protrusion formed at the center of its front part. A spring coupled to the protrusion of the upper half case has legs which are slidably held in the recess.

As was described above, the spring for biasing the locking member is coupled to the upper half case, and its legs are held by the recess formed in the locking member. Hence, the locking member can be combined with the upper half case without biasing it. After the locking member is built in the upper half case, the spring can be activated to bias the locking member. Thus, the magnetic tape cassette of the invention offers considerable assembling efficiency. Since the legs of the spring slide on the hard locking member which is high in wear resistance, no shavings are formed by the sliding of the legs of the spring, and therefore no dropouts are caused during a signal recording or reproducing operation. Furthermore, as the spring urges the locking member while its legs slide in the recess formed in the locking members, the locking member is positively urged by the spring, and the legs will never be disengaged from the recess even when vibrated. Thus, the hubs can be locked with high reliability.

DETAILED DESCRIPTION OF THE PRFERRED EMBODIMENTS

One preferred embodiment of this invention will be described with reference to the accompanying drawings.

Figure 1:
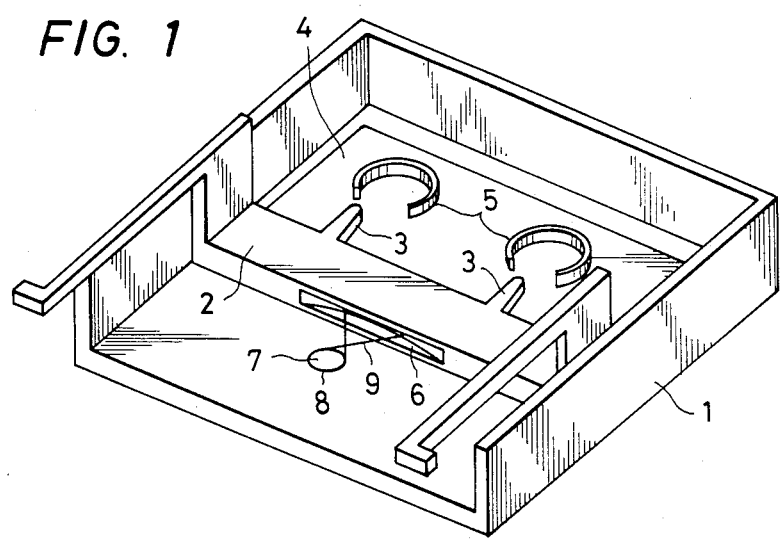
FIG. 1 is a bottom, front perspective view showing a locking member combined with the upper half case of a magnetic tape cassette according to this invention.

FIG. 1 shows a locking member 2 built in the upper half case 1 of a magnetic tape cassette. The locking member 2 has a pair of protrusions 3 at its edge on the rearward side of the cassette. When these protrusions 3 are moved into the receiving rings 5 of a window member 4, hubs held in the receiving rings 5 are locked.

The window member 4 is a transparent panel fixed to the upper surface of the upper half case 1 so that the user can view the reels of tapes through a hole in the otherwise opaque upper half case 1.

Figure 5:
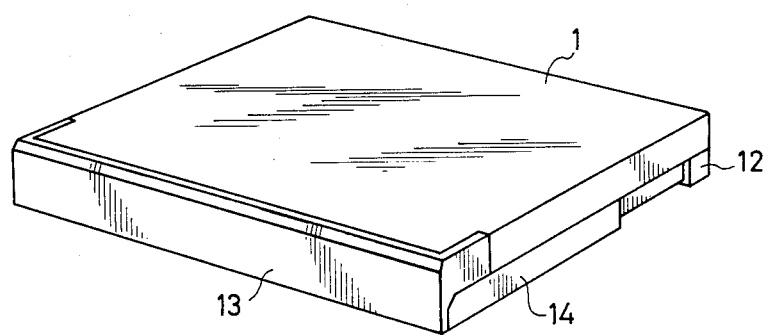
FIG. 5 is a top, front perspective view of an assembled tape cassette.

An assembled tape cassette is illustrated in FIG. 5 and consists principally of the upper half case 1 joined to a lower half case 12. The lower half case 12 has the same general dimensions of the upper half case but has a front central opening on its lower surface to expose the tape. A front guard panel 13 is rotatably attached to the upper case half 1 and swings upwards to expose the tape. A sliding panel 14 is slidably connected to the lower half case 12. When it is slid backwards a bridging panel exposes the tape through front central opening of the lower half case 12.

Figure 6:
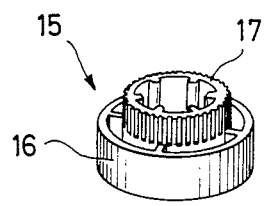
FIG. 6 is a side perspective view of the top of a hub.

Two hubs 15, shown in FIG. 6, wind the tape around an outer hub 16. The outer hub 16 has an axial gap at its back which is not important for this invention. Fixed to the outer hub 16 is an inner hub 17 which extends further upward to rotatably fit within one of the receiving rings 5 of the upper half case 1. On the outer surface of the inner hub 17 are axial teeth which are engaged by the protrusions 3 of the locking member 2 when it is moved backwards. The hubs 15 are rotated by spindles inserted through two holes in the lower half case 12.

Returning to FIG. 1, a recess 6 is formed in the front end face of the locking member 2 in such a manner that it extends horizontally. On the other hand, a protrusion 7 is formed at the center of the front part of the upper half case 1, and a spring 8 is coupled around the protrusion 7. The two ends 9, namely legs, of the spring 9 are abutted against an interior surface of the recess 6, to urge the locking member 2 towards the hubs (or rearwardly of the cassette). Although the locking member 2 is kept urged towards the hubs 15, the locking member 2 is slidable both in the front-to-rear direction and in the rear-to-front direction of the cassette. Therefore, when the cassette is not in use, the locking member is urged by the spring 8, and the protrusions 3 are moved to lock the hubs 15. When the cassette is in use, the locking member 2 is forcibly moved forwardly of the cassette against the elastic force of the spring 8, to release the hubs 15.

The above-described cassette is assembled as follows. First, the locking member 2 is combined with the upper half case as shown in FIG. 1. In this case, it is preferable that the vertical movement of the locking member 2 is limited. For instance, a member for holding the locking member is formed on the window member 4 so that the locking member 2 can accurately slide both in the front-to-rear direction and in the rear-to-front direction of the cassette.

After the locking member 2 has been combined with the upper half case 1, the spring 8 is mounted on the protrusion 7 of the upper half case 1, and the legs 9 of the spring 8 are inserted into the recess 6 of the locking member 2. As a result, the locking member 2 is displaced to the hub locking position, that is, the position where it would abut against the hubs 15 if they were mounted within the receiving rings 5. Thereafter, the upper half case 1 with the locking member 2 is combined with the lower half case 12 to which components such as, for instance, the hubs 15 on which the magnetic tape has been wound are attached. Thus, the magnetic tape cassette has been assembled.

As is apparent from the above description, the locking member 2 is not urged by the spring 8 when combined with the upper half case 1, and it is urged by the spring 8 after the spring 8 has been combined with the upper half case 1. Therefore, the magnetic tape cassette according to the invention can be readily assembled, and the locking member 2 is urged accurately at the sliding position by the spring 8.

Figure 2:
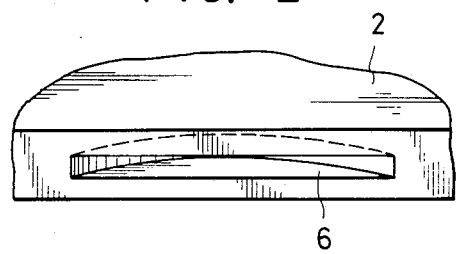
FIG. 2 is an enlarged view of the locking member, showing its recess.
Figure 3:
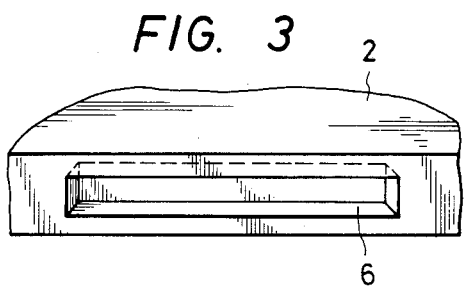
FIGS. 3 and 4 are diagrams showing modifications of the recess in the locking member.
Figure 4:

FIG. 2 is an enlarged view of the recess 6 of the locking member 2. That is, the recess 6 are curved inwardly. However, the invention is not limited thereto or thereby. That is, the recess 6 should be so shaped that it can positively hold the legs 9 of the spring 8 and the legs 9 can slide right and left in the recess. For instance, the recess 6 may be a rectangular one having no curved surface as shown in FIG. 3. Alternatively, the recess 6 may be triangularly shaped in cross-section as shown in FIG. 4.

The locking member is made of hard resin such as POM (polyoxymethylene) resin. Therefore, even if, when the hubs 15 are locked and released, the locking member 2 slides in the cassette so that the legs 9 of the spring 8 are slid right and left in the recess 6 repeatedly, the recess 6 will never be abraded or chipped by the legs 9 of the spring 8. Accordingly, no shavings are formed inside the cassette, and the magnetic tape in the cassette is free from the adverse effect of the shaving.

According to the invention, after being built in the upper half case, the locking member is urged by the spring which is attached to the upper half case. That is, the locking member can be combined with the upper half case before being biased by the spring. Therefore, the magnetic tape cassette of the invention can be readily assembled. Furthermore, as is apparent from the above description, the legs of the spring operate while being held in the recess of the locking member. Therefore, the locking member is positively urged by the spring, so that the hubs can be locked with high reliability. As the locking member is made of hard resin such as POM resin, no shavings are formed in the cassette, which eliminates the difficulty that dropouts occur during the recording or reproducing operation of the magnetic tape. That is, signal recording or reproducing operations can be accurately carried out with the magnetic tape cassette of the invention.

What is claimed is:

1. A tape cassette, comprising:
a first half case, having a protrusion at a central portion;
a second half case joined to said first half case and forming an internal space therein, wherein said protrusion projects into the internal space;

two hubs for winding tape rotatably mounted in said internal space;

a locking member slidable in a first direction away from said protrusion and toward said hubs within said internal space and including means for selectively locking said hubs, said locking member having a recess on a side facing in a second direction toward said protrusion and away from said hubs, said recess extending laterally in parallel to a joining line of said first and second half cases; and a spring coupled to said protrusion and having legs extending in said first direction and slidably held in said recess for biasing said locking member in said first direction.

2. A tape cassette as recited in claim 1, wherein said recess has a concave surface facing in said second direction.

3. A tape cassette as recited in claim 1, wherein said recess is a rectangular recess.

4. A tape cassette as recited in claim 1, wherein said recess has a triangular vertical cross-section.

5. A tape cassette as recited in claim 1, wherein said locking member comprises a hard resin.

6. A tape cassette as recited in claim 5, wherein said hard resin comprises polyoxymethylene.

* * * * *